(12) United States Patent
Fleure et al.

(10) Patent No.: US 7,660,201 B2
(45) Date of Patent: Feb. 9, 2010

(54) AUTONOMOUS SEISMIC DATA ACQUISITION UNIT

(75) Inventors: Thomas J. Fleure, Houston, TX (US); Larry Walker, Houston, TX (US)

(73) Assignee: Autoseis, Inc., Houston, TX (US)

( * ) Notice: Subject to any disclaimer, the term of this patent is extended or adjusted under 35 U.S.C. 154(b) by 0 days.

(21) Appl. No.: 11/466,298

(22) Filed: Aug. 22, 2006

(65) Prior Publication Data
US 2008/0049550 A1    Feb. 28, 2008

(51) Int. Cl.
*G01V 1/28* (2006.01)
(52) U.S. Cl. .......................... 367/50; 367/79; 368/159; 331/2
(58) Field of Classification Search ................... 367/56, 367/77–80, 50; 331/2–3; 368/159
See application file for complete search history.

(56) References Cited

U.S. PATENT DOCUMENTS

| | | | | |
|---|---|---|---|---|
| 3,972,019 | A * | 7/1976 | Bassett | 367/77 |
| 4,281,403 | A * | 7/1981 | Siems et al. | 367/76 |
| 4,839,613 | A * | 6/1989 | Echols et al. | 331/69 |
| 5,847,613 | A * | 12/1998 | Langlet et al. | 331/3 |
| 6,081,163 | A * | 6/2000 | Ujiie et al. | 331/2 |
| 6,584,406 | B1 * | 6/2003 | Harmon et al. | 702/6 |
| 6,707,346 | B2 * | 3/2004 | Tillotson et al. | 331/175 |
| 6,831,525 | B1 * | 12/2004 | Beaudin et al. | 331/176 |
| 7,046,584 | B2 * | 5/2006 | Sorrells et al. | 368/159 |
| 7,212,075 | B2 * | 5/2007 | Young et al. | 331/176 |
| 7,230,543 | B2 * | 6/2007 | Minto et al. | 340/854.3 |
| 2002/0193947 | A1 * | 12/2002 | Chamberlain | 702/16 |
| 2004/0105341 | A1 * | 6/2004 | Chamberlain et al. | 367/21 |
| 2005/0007259 | A1 * | 1/2005 | Minto et al. | 340/854.3 |
| 2005/0007887 | A1 * | 1/2005 | Sorrells et al. | 368/107 |
| 2005/0012561 | A1 * | 1/2005 | Young et al. | 331/176 |
| 2005/0047275 | A1 * | 3/2005 | Chamberlain et al. | 367/56 |
| 2005/0122839 | A1 * | 6/2005 | DiFoggio et al. | 367/27 |
| 2005/0285645 | A1 * | 12/2005 | Hall et al. | 327/165 |
| 2006/0146646 | A1 * | 7/2006 | Fanini et al. | 367/27 |
| 2006/0192625 | A1 * | 8/2006 | Sorrells et al. | 331/158 |

* cited by examiner

*Primary Examiner*—Scott A Hughes

(57) ABSTRACT

A method, apparatus and system for acquiring land seismic data includes acquiring seismic data with a first autonomous seismic data acquisition unit and a second autonomous seismic data acquisition unit wherein each acquisition unit comprises a plurality of digitally controlled temperature-compensated crystal oscillators. Oscillator-based timing signals are acquired that are associated with the plurality of digitally controlled temperature-compensated crystal oscillators and a time correction is determined to apply to the seismic data acquired with the first autonomous seismic data acquisition unit. The time correction is determined using the oscillator-based timing signals from the first and second autonomous seismic data acquisition units.

15 Claims, 5 Drawing Sheets

AUTONOMOUS SEISMIC DATA ACQUISITION UNIT

BACKGROUND

1. Technical Field

The apparatus and methods are related to equipment and processing for seismic exploration for oil and gas, and more particularly to acquiring and processing seismic data.

2. Description of the Related Art

Reflection seismology is a branch of seismology that uses reflected seismic waves to produce images of the Earth's subsurface. Using seismic exploration methods which include noting the time it takes for a reflection to arrive at a receiver, it is possible to estimate the depth of the feature that generated the reflection.

Seismic exploration for hydrocarbons is conducted using a source of seismic energy and receiving and recording the energy generated by the source using seismic detectors. On land, the seismic energy source may be a controlled explosive charge or another energy source having the capacity to import impacts or mechanical vibrations at or near the earth's surface. Seismic waves generated by these sources travel into the earth subsurface and are reflected back from strata boundaries and reach the surface of the earth at varying intervals of time depending on the distance traveled and the characteristics of the subsurface material traversed. The return waves are detected by the sensors and transduced into electrical signals which are recorded for subsequent processing.

Normally, signals from sensors located at varying distances from the source are added together during processing to produce "stacked" seismic traces. In marine seismic surveys, the source of seismic energy is typically air guns. Marine seismic surveys typically employ a plurality of sources and/or a plurality of streamer cables, in which seismic sensors are mounted. Land surveys may be acquired with sources such as dynamite, accelerated weight drop or seismic vibrators. Sources and receivers may be positioned in a collinear fashion to record 2-D profiles or in an areal fashion to acquire 3-D data. By acquiring data at different times, the data may be formed into "4-D" data that may illustrate changes in the subsurface over time.

The process of exploring for and exploiting subsurface hydrocarbon reservoirs is often costly and inefficient because operators have imperfect information from geophysical geological characteristics about reservoir locations. Furthermore, a reservoir's characteristics may change as it is produced.

The time from mineral discovery to production may be shortened if the total time required to evaluate and explore a survey area can be reduced by reducing the time and equipment necessary for deploying to acquire geophysical data. Equipment that is autonomous or stand-alone and that doesn't need to be in constant communication with a a control center could represent a reduction in resources and an increase in data acquisition efficiency.

Seismic sensors and their associated autonomous seismic data acquisition unit equipment can be expensive to position, to use and to continuously maintain in field operations. Decreasing the unit cost of deployed seismic units is desirable.

SUMMARY

In one embodiment a land seismic data acquisition apparatus includes a memory, at least one seismic sensor, a temperature sensor, at least one processor, a plurality of digitally controlled temperature-compensated crystal oscillator (DC-TCXO) associated with an on-board real-time clock and a data input/output interface. The apparatus may include an application program for determining a time delay between the real time clock and an external reference timing signal or an application program to determine a time correction value based on continuous clock count accumulations. The apparatus may include a removable memory module and/or an analog to digital converter.

In another embodiment a method for acquiring land seismic data includes acquiring seismic data with a first autonomous seismic data acquisition unit and a second autonomous seismic data acquisition unit wherein each acquisition unit comprises a plurality of digitally controlled temperature-compensated crystal oscillators. Oscillator-based timing signals are acquired that are associated with the plurality of digitally controlled temperature-compensated crystal oscillators and a time correction is determined to apply to the seismic data acquired with the first autonomous seismic data acquisition unit. The time correction is determined using the oscillator-based timing signals from the first and second autonomous seismic data acquisition units.

In another aspect the method includes determining the time correction as a function of the relative time difference between a selected plurality of the oscillator-based timing signals from the first and second autonomous seismic data acquisition units. The method may include applying the determined time correction value to the recorded seismic data. The corrected data from the first autonomous seismic data acquisition unit may be merged with data collected from a telemetry-based seismic data acquisition system. For quality control purposes, a relative time difference may be determined between the first autonomous seismic data acquisition unit and a telemetry-based seismic data acquisition system. A reference timing signal from a reference clock may be recorded on at least one of the autonomous seismic data acquisition units.

Another aspect includes determining a time correction associated with the first autonomous seismic data acquisition units that is function of one of the relative time difference between the plurality of digitally controlled temperature compensated crystal oscillators, a long term time history of the plurality of digitally controlled temperature compensated crystal oscillators or a temperature history of at least one of the plurality of digitally controlled temperature compensated crystal oscillators. The autonomous seismic data acquisition units may include removable media storage.

In still another embodiment a method for recording land seismic data includes deploying a first and second autonomous seismic data acquisition unit for acquiring seismic signals and deploying a plurality of digitally controlled temperature-compensated crystal oscillators with the first and second autonomous seismic data acquisition unit to generate oscillator-based timing signals. The oscillator-based timing signal is used to determine a time correction apply to the seismic data acquired with the first autonomous seismic data acquisition unit based on the oscillator-based timing signals from the first and second autonomous seismic data acquisition units and the determined time correction is applied to the seismic data.

In another aspect the temperature is recorded in the first autonomous seismic data acquisition unit and the determined time correction may be computed as a function of at least the recorded temperature, the oscillator-based timing signals, or a synchronizing-time signal from a master clock. The method may include accessing a database of the long term historical performance of the digitally controlled temperature compensated crystal oscillators and computing the determined time correction as a function of the recorded temperature, oscillator-based timing signals, values from the historical database of digitally controlled temperature compensated crystal oscillator performance or a synchronizing-time signal from a master clock. A synchronizing-time signal from a master clock may be recorded on the first autonomous seismic data acquisition unit at relatively sparse intervals in time and/or prior to unit deployment. The corrected data may be merged with seismic data acquired with a telemetry-based seismic system. The seismic data and the oscillator-based timing signals from the first autonomous seismic data acquisition unit may be downloaded to a data depository.

DETAILED DESCRIPTION

Information to enable imaging the structure of the earth may be extracted from naturally occurring or man-made seismic waves and vibrations measured at the earth's surface. These waves may be measured using seismic data acquisition equipment and methods.

Figure 1:
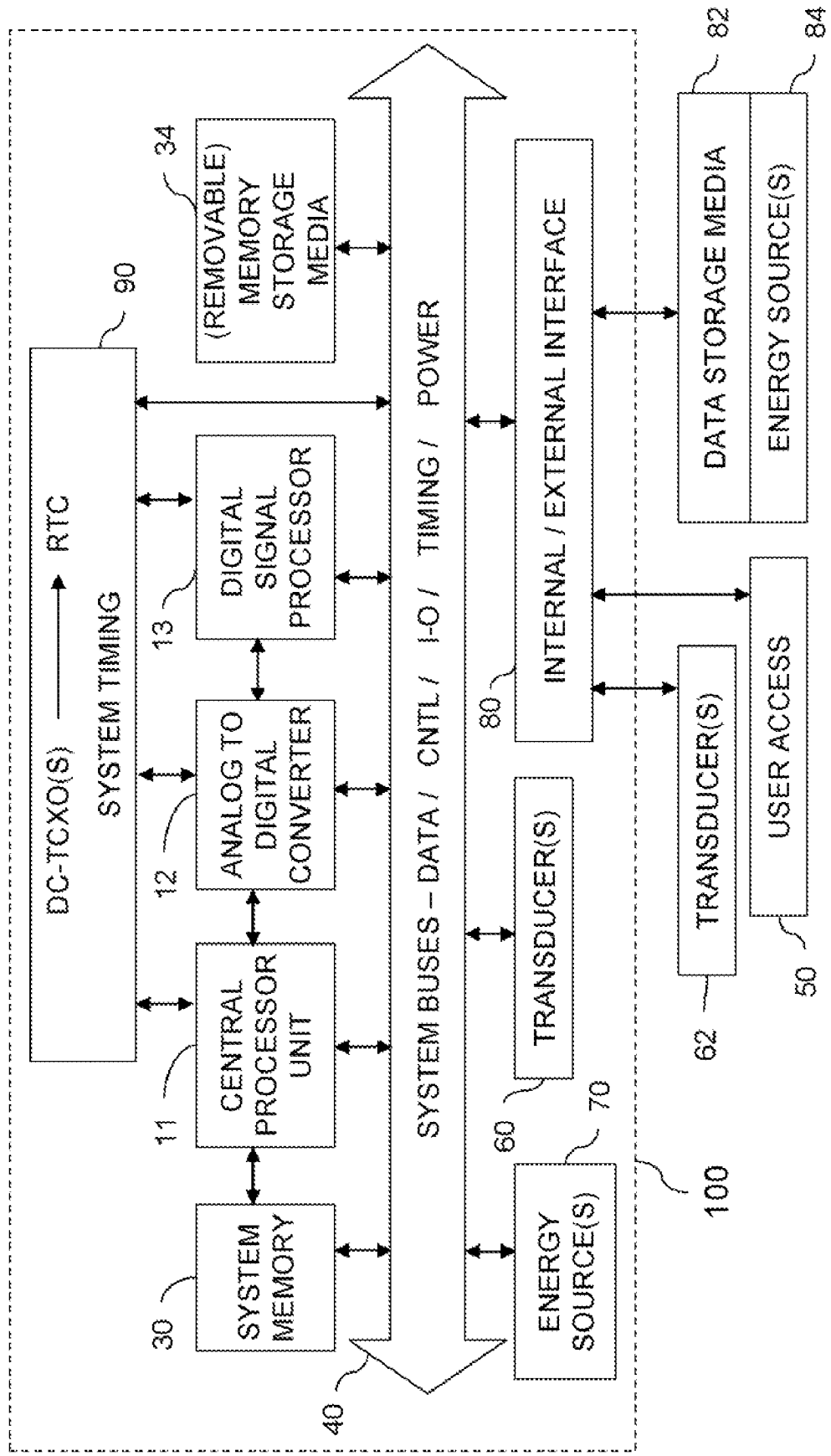
FIG. 1 is diagrammatic representation of a machine in the form of an autonomous seismic data acquisition unit within a set of instructions, when executed may cause the machine to perform any one or more of the methods and processes described herein.

FIG. 1 illustrates a schematic example of the hardware and operating environment for which embodiments as described herein and their equivalents may be practiced. The description of FIG. 1 includes a general description of an autonomous seismic data acquisition unit and a computing environment for which the embodiments may be implemented. Although specific hardware may not be required, embodiments may be implemented in the general context of computer-executable instructions, such as program modules, being executed by a computer or processor. Various embodiments may be practiced with a personal computer, a mainframe computer or combinations that include workstations with servers. Program modules include routines, programs, objects, components and data structures for performing tasks, processing data, and recording and displaying information.

Embodiments may be practiced with various system configurations that separately or in combination with the autonomous seismic data acquisition unit may include hand-held devices, multiprocessor systems, microprocessor-based or programmable consumer electronics, network computers, minicomputers, mainframe computers, and the like. Embodiments may be practiced with tasks performed in and over distributed computing environments that include remote processing devices linked through a communications network. Program modules operating in distributed computing environments may be located in various memory locations, both local to the acquisition unit and remote.

FIG. 1 is illustrative of a hardware and operating environment for implementing a general purpose autonomous seismic data acquisition unit 100. Autonomous seismic data acquisition unit 100 includes a processing unit 11 that may include 'onboard' instructions. Autonomous seismic data acquisition unit 100 has a system memory 30 attached to a system bus 40 that operatively couples various system components including system memory 30 to processing unit 11. The system bus 40 may be any of several types of bus structures using any of a variety of bus architectures as are known in the art.

While a single processing unit 11 is illustrated in FIG. 1, there may be a single central-processing unit (CPU) 11 and/or a digital signal processor (DSP) 13 or both or a plurality of processing units. Autonomous seismic data acquisition unit 100 may be a standalone device, a distributed device, or may operate as a standalone computing/acquisition device.

System memory 30, which may be any type of physical memory, may include read only memory (ROM) with a basic input/output system (BIOS) containing the basic routines that help to transfer information between elements within an autonomous seismic data acquisition unit 100, such as during start-up. System memory 30 of autonomous seismic data acquisition unit 100 further may include random access memory (RAM) that may include an operating system (OS), an application program and data.

Autonomous seismic data acquisition unit 100 may include a disk drive or flash memory to enable reading from and writing to an associated computer or machine readable medium. Computer readable media includes application programs and program data. Autonomous seismic data acquisition unit 100 may include memory storage 34 memory that is optionally removable.

For example, computer readable media 30 or 34 may include programs to process seismic data, which may be stored as program data and may be distributed between media 30 and 34. An application program associated with the computer readable medium 30 or 34 may include at least one application interface for receiving and/or processing program data. The program data may include seismic data acquired according to embodiments disclosed herein. At least one application interface may be associated with acquiring seismic data and associating the acquired data with data from the real time clock 90.

A disk drive, whether comprising system memory 30 or storage media 34 may be a flash memory. Alternatively the disk drive may be a hard disk drive for a hard drive (e.g., magnetic disk) or a drive for a magnetic disk drive for reading from or writing to a removable magnetic media, or an optical disk drive for reading from or writing to a removable optical disk such as a CD ROM, DVD or other optical media.

Memory 30, whether flash memory, a hard disk drive, magnetic disk drive or optical disk drive is connected to the system bus 40 by an interface (not shown). Memory 30 and any other associated computer-readable media enable nonvolatile storage and retrieval for application programs and data that include computer-readable instructions, data structures, program modules and other data for autonomous seismic data acquisition unit 100. Memory 30 enables storage of large data files such as seismic data, timing data and temperature data. Memory 30 may include more than one physical drive and each physical drive may store over 30 gigabytes of data. Any type of computer-readable media that can store data accessible by a computer, including but not limited to cassettes, flash memory, digital video disks in all formats, random access memories (RAMs), read only memories (ROMs), may be used in an autonomous seismic data acquisition unit 100 operating environment.

Data input and output devices may be connected to a processing unit 11 and/or a digital signal processor 13 through a internal/external interface 80 that may be coupled to the system bus. Further, user accessor 50 may be a universal serial bus (USB). A user may enter commands or data into an autonomous seismic data acquisition unit 100 through input devices connected to interfaces 50 and/or 80 such as a keyboard and pointing device (mouse). Other peripheral input/output devices connectable through interfaces 50 and/or 80 may include without limitation a remote computer, microphone, joystick, game pad, satellite dish, scanner or fax, speakers, wireless transducer, etc. Operation of an autonomous seismic data acquisition unit 100 may include other peripheral input/output devices that may be connected with interfaces 50 and/or 80 such as a machine readable media (e.g., a memory stick), a printer and one or more external transducers 62. A seismic sensor or seismometer for practicing embodiments disclosed herein is a non-limiting example of data sensor 62. Autonomous seismic acquisition units may be attached to one or a plurality of transducers 62 such as geophones, hydrophones or accelerometers.

An autonomous seismic data acquisition unit 100 may include one or more onboard transducers 60 for monitoring components and environmental conditions in the unit. Transducer 60 may be geophone, accelerometer or hydrophone and may be a multiple component device, and acquire orthogonal signals. Data sensor 60 may enable recording of environmental conditions or electronic components internal to an autonomous seismic data acquisition unit 100. An energy source 70 provides power to unit 100. Input/output 80 enable coincident or contemporaneous data and energy transfer, for example data transfer between unit 100 and data storage 82, and energy transfer between unit 100 and an external energy source or power supply 84.

Real time clock 90 is provided to keep accurate time associated with acquired seismic data. The real time clock may include one or more digitally controlled temperature-compensated crystal oscillators (DC-TCXO). The timing information (or oscillator counts) acquired from the real time clock may be written to one or more files. Data may be recorded to a timing file, a seismic data file or a reference data file associated with a seismic data file. Alternatively the timing data may be written into a seismic file. The RTC may further comprise a sensor to record the temperature associated with RTC 90 or each DC-TCXO. RTC 90 may comprise a plurality of DC-TCXOs and a plurality of temperature sensors. Transducers 60 may be associated with an RTC and record temperature.

A temperature-compensated crystal oscillator typically has stability on the order of $1 \times 10^{-6}$ accuracy, which could be an approximate drift of 0.6 milliseconds in 10 minutes. This time drift may not be considered acceptable for an internal clock establishing a time reference to apply to data acquired with seismic data acquisition units not in communication with an accurate reference clock.

While individual temperature-compensated crystal oscillators have variable time drift, each time drift for an oscillator may be fairly consistent and often nearly linear over different time periods. This consistency may service as a basis for determining a time correction value to apply to the time series data associated with an RTC comprising a temperature-compensated crystal oscillator. The accuracy of an oscillator associated data may be increased by compensating the oscillator drift based on the individual oscillator history as well as the history of several oscillators compared together. For example, an oscillator history may be acquired over a substantial portion of the life of the temperature-compensated crystal oscillator. Acquiring a digital record of a DC-TCXO history over time allows for increased accuracy in determining and applying time values to compensate for oscillator induced time drift. Consistency in the oscillator dynamic behavior and history may be improved by not powering down the temperature-compensated crystal oscillator.

By comparing several oscillator count accumulations all types of timing variations, including time-drift, may be identified and corrected. By comparing oscillator count accumulations of each a plurality of temperature-compensated crystal oscillator based RTCs it is possible to significantly improve the accuracy of all the RTCs. Monitoring and accounting for the dynamic behavior of a group of RTCs—as a group—allows for improving the accuracy of each RTC.

An analog to digital converter 12 may be associated with any component within autonomous seismic data acquisition unit 100.

Figure 2:
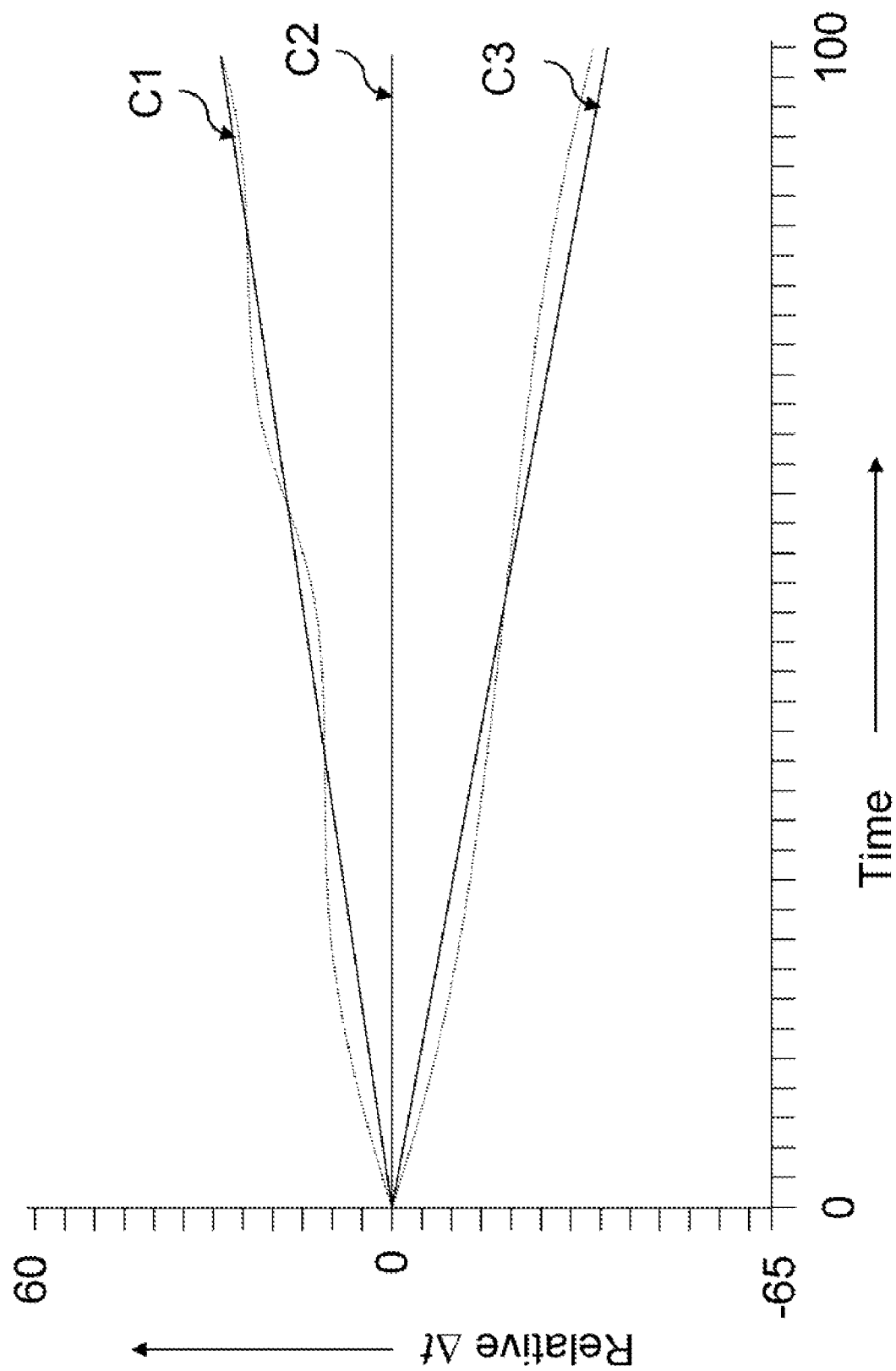
FIG. 2 is a graphical representation of the relative timing differences between temperature-compensated crystal oscillators over time.

FIG. 2 is a display graph of trends of relative time variation between individual RTCs. The relative time values and time values represented along the axes of FIG. 2 are arbitrary units. The dotted line in FIG. 2 is representative of actual time differences relative to other time measurements. Trend line C1 represents the time variation trend of an individual RTC. This trend may be determined as an average or a moving average or any other statistically significant measure applied to the underlying data. C1 is the trend of the relative time variation or time-drift relative to trend line C2 where C2 represents the time variation trend of another RTC. C2 is taken as an arbitrary reference for display in the example of FIG. 2, but any other oscillator or no oscillator may be used as a reference, as it is a comparison of the relative variation of a plurality of RTCs that enable the increase in timing accuracy that may be applied to the data. When the oscillator data are rectified to real time with a master clock or "actual" time as determined from the plurality of oscillators, the real time may be taken as the display reference.

The improvement in timing accuracy due to determining and applying time compensation values may result in time-drift on the order of 1 or 2 milliseconds over a period of several weeks. Whether the time periods for which dynamic trends will be compared are measured in minutes, days or weeks will depend on the relative time variation histories of the oscillators involved in the group. While dynamic trends may be variable over relatively short time periods, the overall dynamic system behavior that includes a plurality of DC-TCXOs allows for time corrections to compensate these variations and leads to long term timing stability adequate for application to stand-alone seismic data acquisition units.

It should be appreciated that a plurality of time-compensated crystal oscillators may be resident within one data acquisition unit, but also a plurality of time-compensated crystal oscillators for which time compensation values may be determined may be located in a multiplicity of seismic data acquisition units. Data from a group of units may be utilized together to increase the timing accuracy of individual units in the group. Using a plurality of RTC components in autonomous seismic data acquisition units allows for elimination of spurious data as well as adjusting for time-drift or other timing variations.

The time drift trend of an RTC may be a function of temperature, even though an oscillator is temperature compensated. A time drift compensation value may be determined as function of one or more parameters, such as the time drift history relative to other oscillators coincident in time, the long term time drift history of the oscillator, the long term temperature history of the oscillator, and the temperature history of the other oscillators coincident in time.

Figure 3:
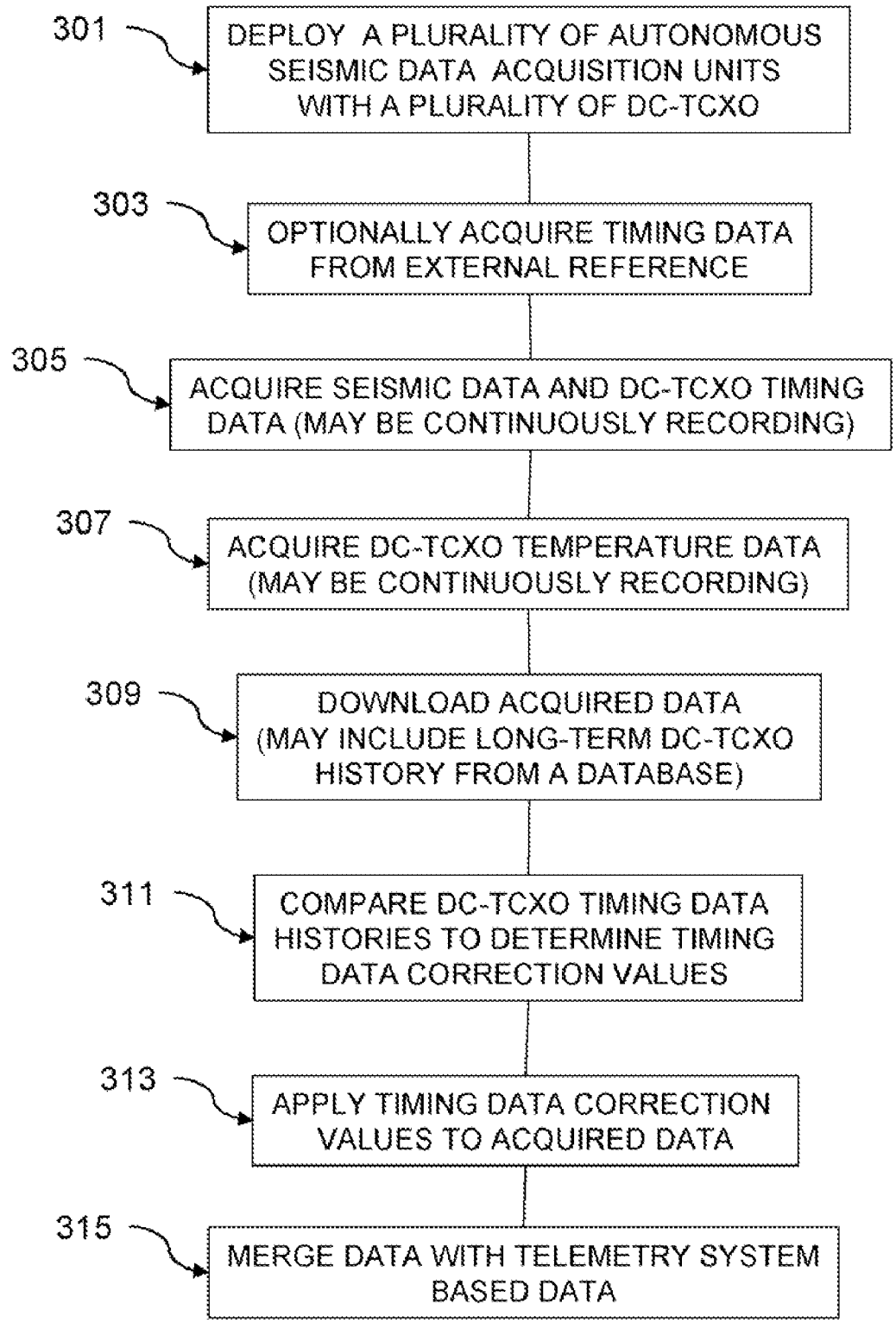
FIG. 3 is a flow chart illustrating a method of acquiring seismic data.

In one embodiment a method for recording seismic data, illustrated in FIG. 3, includes deploying a plurality of autonomous seismic data acquisition units for receiving and recording seismic signals and installing a plurality of digitally controlled temperature-compensated crystal oscillators within each autonomous seismic data acquisition unit 301. The method may include a synchronizing timing signal from a master or other reference clock prior to deployment and subsequently recording an additional synchronizing signal from a master or other reference clock on the autonomous seismic data acquisition units at relatively sparse intervals in time relative to the supplementary timing signal 303. Relatively sparse intervals include time periods of from hours to days. The digitally controlled temperature-compensated crystal oscillators are used to generate a supplementary timing signal (associated with oscillator counts). The timing signal may then be associated with acquired seismic data 305. Temperature data associated with a DC-TCXO may be recorded as well 307.

Subsequent to recording seismic and timing data, the seismic data, timing signals and synchronizing signals are downloaded 309 from the autonomous seismic data acquisition units. One or more data files may be dedicated to timing data, and timing data may be written to general data files. Historical data that includes previous deployment information associated with any DC-TCXO may also be downloaded from a database.

The supplementary timing signals and any synchronizing signals may be used to determine relative timing errors or adjustments between a plurality of DC-TCXOs within autonomous seismic data acquisition units 311 so that data may be synchronized to a master real time reference. Further, the supplement timing signals and any synchronizing signals may be used to determine relative timing errors or adjustments between the autonomous seismic data acquisition units. A time compensation or adjustment value may be determined for the timing signals associated with each unit. Further, a real time reference may be determined from a comparison of the histories and relative time differences associated with the various oscillators. The relative timing errors between data recorded on different autonomous seismic data acquisition units may be corrected to a real time master reference prior to combining data. Alternatively, the time compensation values may be included as header information or otherwise associated with acquired data to be applied in subsequent data processing. After timing corrections are applied to the data or otherwise associated with the seismic data (e.g., stored in headers or a database), the data may be merged with other datasets, such as telemetry based acquisition data sets 315.

In another embodiment a temperature history associated with each autonomous seismic data acquisition unit is recorded. A recorded temperature, a timing signal and a synchronizing or reference signal are used to determine relative timing errors between autonomous seismic data acquisition units and/or to establish a real-time reference relative to the acquisition units.

Another embodiments uses a database of the historical performance of one or more digitally controlled temperature-compensated crystal oscillators. The recorded temperature, supplementary timing signals, the historical database of digitally controlled temperature compensated crystal oscillator performance, and the synchronizing signals are used to determine relative timing errors or a time compensation value between the autonomous seismic data acquisition units.

In one embodiment a method for recording seismic data includes deploying a plurality of autonomous seismic data acquisition units for receiving and recording seismic signals while simultaneously deploying a telemetry seismic data system. A plurality of digitally controlled temperature compensated crystal oscillators within each autonomous seismic data acquisition unit generates supplementary timing signals. A synchronizing signal from a master clock may be recorded on the autonomous seismic data acquisition units at relatively sparse intervals in time relative to the supplementary timing signal. Seismic data, supplementary timing signals, and synchronizing signals are downloaded from the autonomous seismic data acquisition units. The supplementary timing signals and the synchronizing signal are used to determine the relative timing errors between the autonomous seismic data acquisition units and the telemetry seismic data system. The relative timing errors between data recorded on different autonomous seismic data acquisition units are corrected prior to combining the data with seismic data recorded on the telemetry seismic data system.

In another embodiment a temperature associated with each autonomous seismic data acquisition unit is recorded. The recorded temperature, the supplementary timing signals, and the synchronizing signals are used to determine relative timing errors between the autonomous seismic data acquisition units and the telemetry seismic data system.

Another embodiment uses a database of the historical performance of a plurality of digitally controlled temperature-compensated crystal oscillators. The recorded temperature, the supplementary timing signals, the historical database of digitally controlled temperature compensated crystal oscillator performance, the supplementary timing signals, and the synchronizing signals are used to determine the relative time errors between the autonomous seismic data acquisition units and the telemetry seismic data system.

Figure 4:
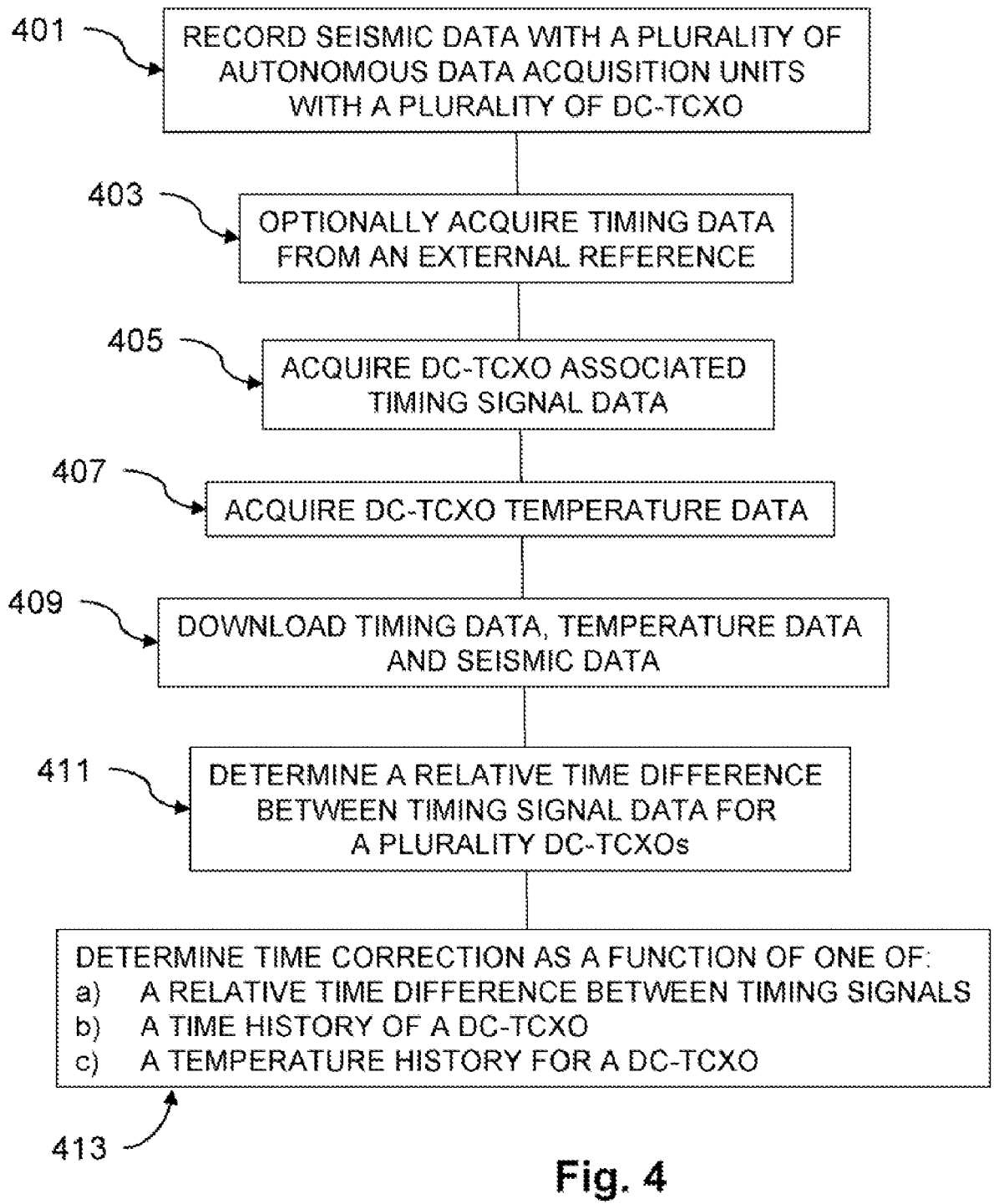
FIG. 4 is a flow chart illustrating a method of determining time correction values.

FIG. 4 is an illustration of a method of data acquisition that includes recording seismic data using a plurality of autonomous data acquisition units 401 that each include a plurality of DC-TCXO associated with an RTC. The timing data acquired by an acquisition unit may be augmented at deployment or from time to time by a reference timing signal 403 from an external reference such as a master clock or a GPS instrument. Timing data associated with the plurality of DC-TCXOs are recorded, and recorded for each of the plurality of DC-TCXOs and/or the acquisition units 405. It is beneficial to the accuracy of the timing signals that data oscillator counts (or sampled subsets thereof) are continuously recorded for the duration of unit deployment. Temperature data associated with a DC-TCXO is recorded as well 407. Subsequent to or during acquisition, the timing data, temperature data and seismic data may be downloaded from the acquisition units for processing 409. During processing a relative time difference between a plurality of timing signals associated with a plurality of DC-TCXOs may be determined 411. The time correction may be determined as a function of one of: i) the relative difference between timing signals, ii) a time history of a DC-TCXO, and iii) a temperature history associated a DC-TCXO.

Figure 5:
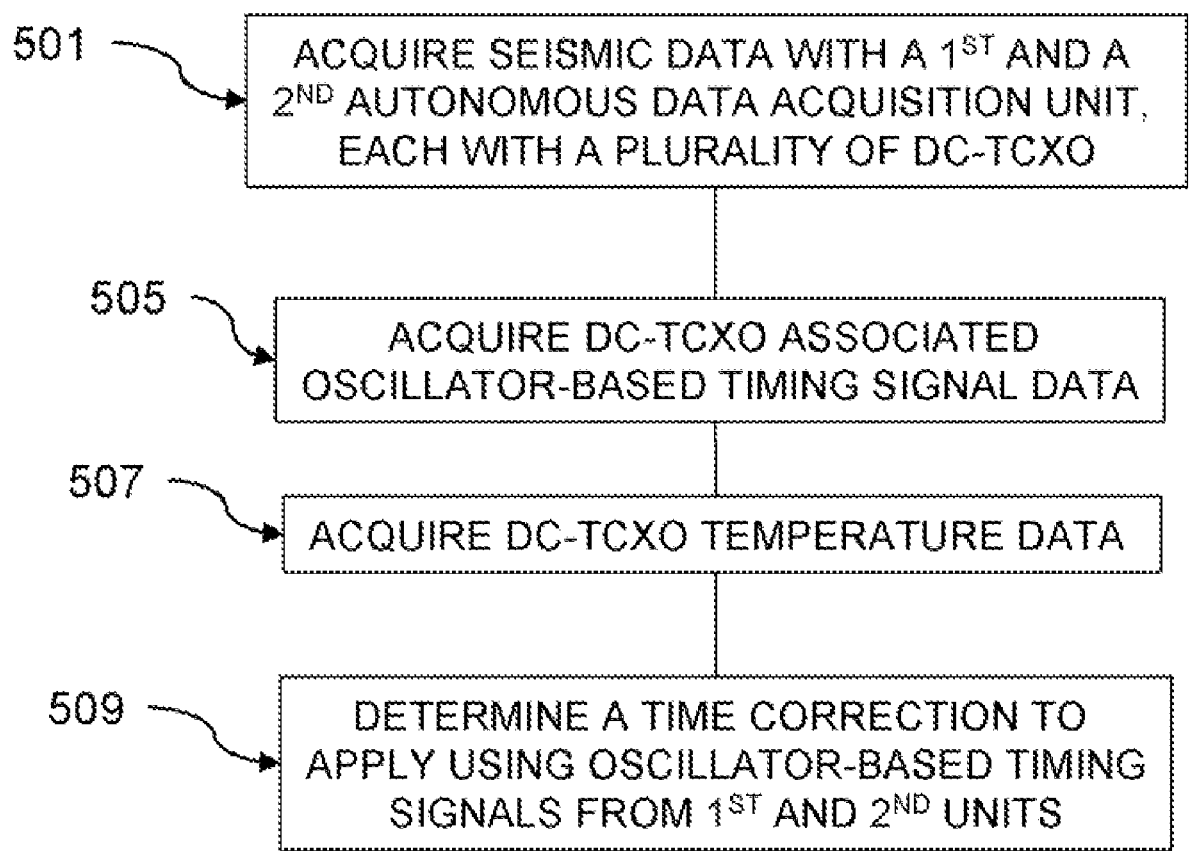
FIG. 5 is a flow chart illustrating a method of determining time correction values using a first and a second autonomous seismic data acquisition unit.

FIG. 5 is an illustration of a method of data acquisition that includes recording seismic data using a first and a second autonomous data acquisition unit 501 that each include a plurality of DC-TCXOs associated with an RTC. The oscillator-based timing data, based on oscillator counts, associated with the plurality of DC-TCXOs are acquired 505. It is beneficial to the accuracy of the timing signals that data oscillator counts (or sampled subsets thereof) are continuously recorded for the duration of unit deployment. Temperature data associated with a DC-TCXO may be recorded as well 507. During processing time correction to apply to acquired seismic data may be determined using oscillator-based timing signals associated with DC-TCXOs from the first and second units 509. The time correction may be determined as a function of one of: i) the relative difference between timing signals, ii) a time history of a DC-TCXO, and iii) a temperature history associated a DC-TCXO. The time corrections may further be referenced or adjusted to a master clock.

In one embodiment a method for acquiring seismic data includes recording seismic data with a plurality of autonomous seismic data acquisition units wherein each acquisition unit comprises a digitally controlled temperature-compensated crystal oscillator. A plurality of timing signals are recorded, timing signals associated with a plurality of digitally controlled temperature compensated crystal oscillators. The digitally controlled temperature compensated crystal oscillators may be associated with the plurality of autonomous seismic data acquisition units. A relative time difference between the plurality of timing signals is determined. A time correction value for application to the timing signal data and/or the seismic data is determined as a function of the relative time difference between the plurality of timing signals. The correction data may be correlated with and be determined as a function of historical data (time or temperature data) associated with the acquisition unit or any of the digitally controlled temperature compensated crystal oscillators associated with the acquisition units. A reference timing signal from a reference clock may be applied to at least one of the autonomous seismic data acquisition units before or during data acquisition. A time correction value associated with at least one of the plurality of autonomous seismic data acquisition units may be a function of one of: i) the relative time difference between the plurality of digitally controlled temperature compensated crystal oscillators, ii) a long term time history of the plurality of digitally controlled temperature compensated crystal oscillators; and iii) a temperature history of at least one of the plurality of digitally controlled temperature compensated crystal oscillators. The autonomous seismic data acquisition units may include a plurality of digitally controlled temperature-compensated crystal oscillators.

While various embodiments have been shown and described, various modifications and substitutions may be made thereto without departing from the spirit and scope of the disclosure herein. Accordingly, it is to be understood that the present embodiments have been described by way of illustration and not limitation.

The invention claimed is:

1. A method for acquiring seismic data comprising:
   a) acquiring seismic data with a first autonomous seismic data acquisition unit and a second autonomous seismic data acquisition unit wherein each acquisition unit comprises a plurality of digitally controlled temperature-compensated crystal oscillators;
   b) acquiring oscillator-based timing signals associated with the plurality of digitally controlled temperature-compensated crystal oscillators; and
   c) determining a time correction to apply to the seismic data acquired with the first autonomous seismic data acquisition unit, the correction determined using the oscillator-based timing signals from the first and second autonomous seismic data acquisition units.

2. The method of claim 1 further comprising determining the time correction as a function of the relative time difference between a selected plurality of the oscillator-based timing signals from the first and second autonomous seismic data acquisition units.

3. The method of claim 1 further comprising applying the determined time correction value to the recorded seismic data.

4. The method of claim 3 further comprising merging corrected data from the first autonomous seismic data acquisition unit with data collected from a telemetry-based seismic data acquisition system.

5. The method of claim 1 further determining a relative time difference between the first autonomous seismic data acquisition unit and a telemetry-based seismic data acquisition system.

6. The method of claim 1 further comprising recording a reference timing signal from a reference clock on at least one of the autonomous seismic data acquisition units.

7. The method of claim 1 further comprising determining a time correction associated with the first autonomous seismic data acquisition units that is a function of one of: i) the relative time difference between the plurality of digitally controlled temperature compensated crystal oscillators, ii) a long term time history of the plurality of digitally controlled temperature compensated crystal oscillators; and iii) a temperature history of at least one of the plurality of digitally controlled temperature compensated crystal oscillators.

8. The method of claim 1 wherein the first autonomous seismic data acquisition unit further comprises removable media storage.

9. A method for recording seismic data comprising:
   a) deploying a first and second autonomous seismic data acquisition unit for acquiring seismic signals;
   b) deploying a plurality of digitally controlled temperature-compensated crystal oscillators with the first and second autonomous seismic data acquisition unit to generate oscillator-based timing signals;
   c) using the oscillator-based timing signal to determine a time correction to apply to the seismic data acquired with the first autonomous seismic data acquisition unit based on the oscillator-based timing signals from the first and second autonomous seismic data acquisition units; and
   d) applying the determined time correction to the seismic data.

10. The method of claim 9, further comprising:
    a) recording the temperature in the first autonomous seismic data acquisition unit;
    b) computing the determined time correction as a function of at least one of: i) the recorded temperature, ii) the oscillator-based timing signals, and iii) a synchronizing-time signal from a master clock.

11. The method of claim 9, further comprising the steps of:
    a) accessing a database of the long term historical performance of the digitally controlled temperature compensated crystal oscillators;
    b) computing the determined time correction as a function of at least one of: i) the recorded temperature, ii) the oscillator-based timing signals, iii) values from the historical database of digitally controlled temperature compensated crystal oscillator performance, and iv) a synchronizing-time signal from a master clock.

12. The method of claim 9 further comprising recording a synchronizing-time signal from a master clock on the first autonomous seismic data acquisition unit after deployment.

13. The method of claim 9 further comprising recording a synchronizing-time signal from a master clock on the first autonomous seismic data acquisition unit prior to deployment.

14. The method of claim 9 further comprising merging the corrected seismic data with seismic data acquired with a telemetry-based seismic system.

15. The method of claim 9 further comprising downloading the seismic data and the oscillator-based timing signals from the first autonomous seismic data acquisition unit to a data depository.

* * * * *